United States Patent [19]
Politt et al.

[11] Patent Number: 5,798,698
[45] Date of Patent: Aug. 25, 1998

[54] METHOD OF MONITORING THE LEVEL OF A LIQUID IN A CONTAINER

[75] Inventors: Joachim-Christian Politt, Bremen; Holger Schroter, Achim; Kerstin Borchers, Bremen, all of Germany

[73] Assignee: Gestra GmbH, Bremen, Germany

[21] Appl. No.: 604,057

[22] Filed: Feb. 20, 1996

[30] Foreign Application Priority Data

Mar. 7, 1995 [DE] Germany .................. 195 07 891.8

[51] Int. Cl.⁶ .............................................. G08B 21/00
[52] U.S. Cl. .................. 340/618; 340/620; 340/622; 340/654; 73/290 R; 73/291; 73/292
[58] Field of Search ........................... 340/618, 622, 340/620, 578, 584; 73/290 R, 291, 292

[56] References Cited

U.S. PATENT DOCUMENTS

| | | | |
|---|---|---|---|
| 3,893,108 | 7/1975 | McBride, Jr. et al. | 340/618 |
| 5,211,904 | 5/1993 | Oosterkamp | 376/258 |
| 5,253,521 | 10/1993 | Abramovich et al. | 73/306 |

FOREIGN PATENT DOCUMENTS 108435  10/1983  European Pat. Off. .

*Primary Examiner*—Jeffery A. Hofsass
*Assistant Examiner*—Julie Lieu
*Attorney, Agent, or Firm*—Collard & Roe, P.C.

[57] ABSTRACT

In cases of application where the critical temperature occurs or could occur, safe monitoring of the level of the liquid was not possible heretofore because the physical properties of the liquid and of the gaseous medium present above the latter in the container no longer differ at this temperature. The method includes the temperature in the container in the monitoring of the level of the liquid. Below a lower comparative temperature value (Tu), the output signal of the evaluator unit is determined by the measuring signal of the level sensor. The measuring signal of the level sensor is disregarded above this value (Tu). The evaluator unit supplies an output signal that is on the safe side with respect to the level of the liquid. The comparative temperature (Tu) is below the critical temperature to an extent such that the inaccuracies in the measurement of the level sensor and the temperature sensor have no interfering effect.

3 Claims, 2 Drawing Sheets

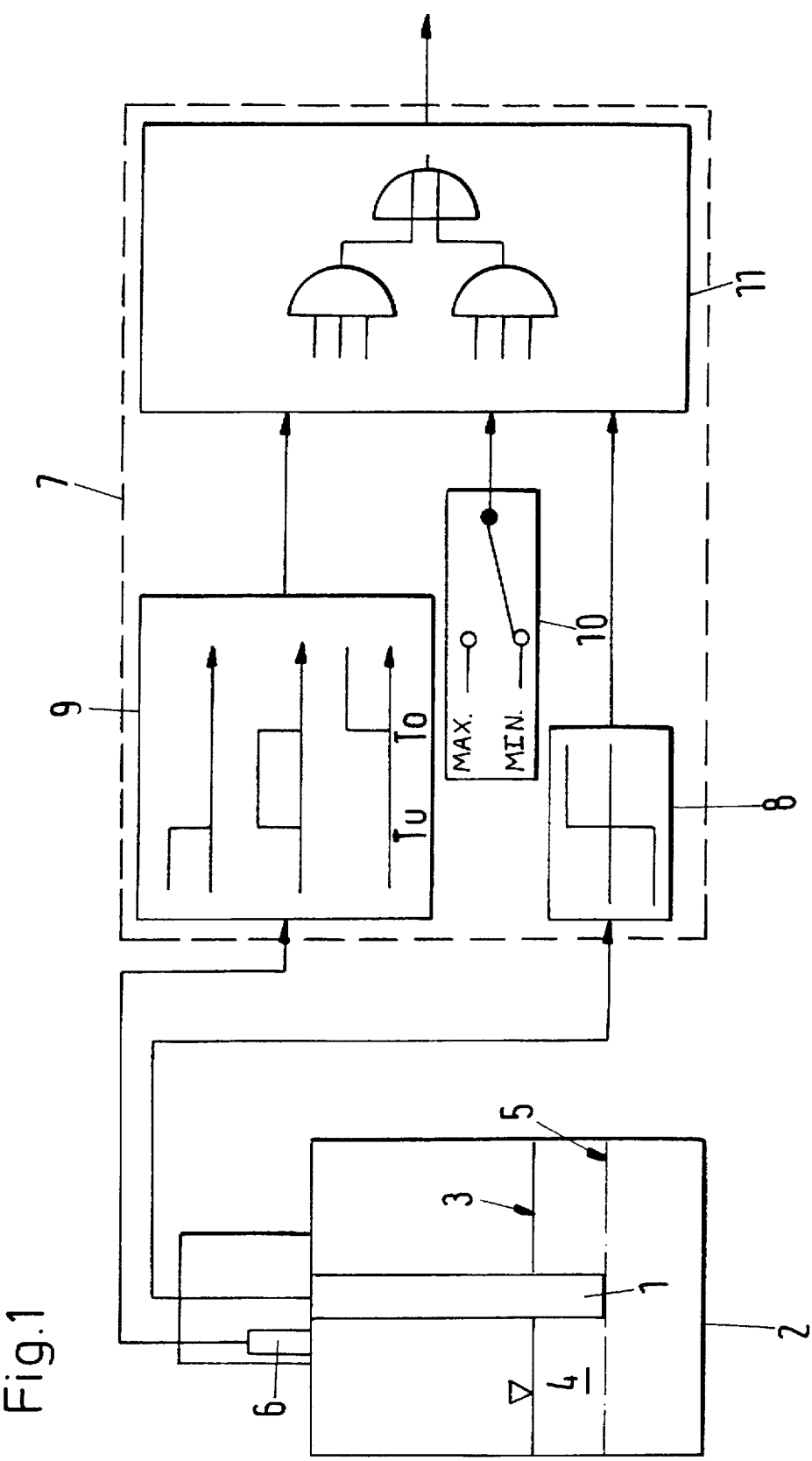

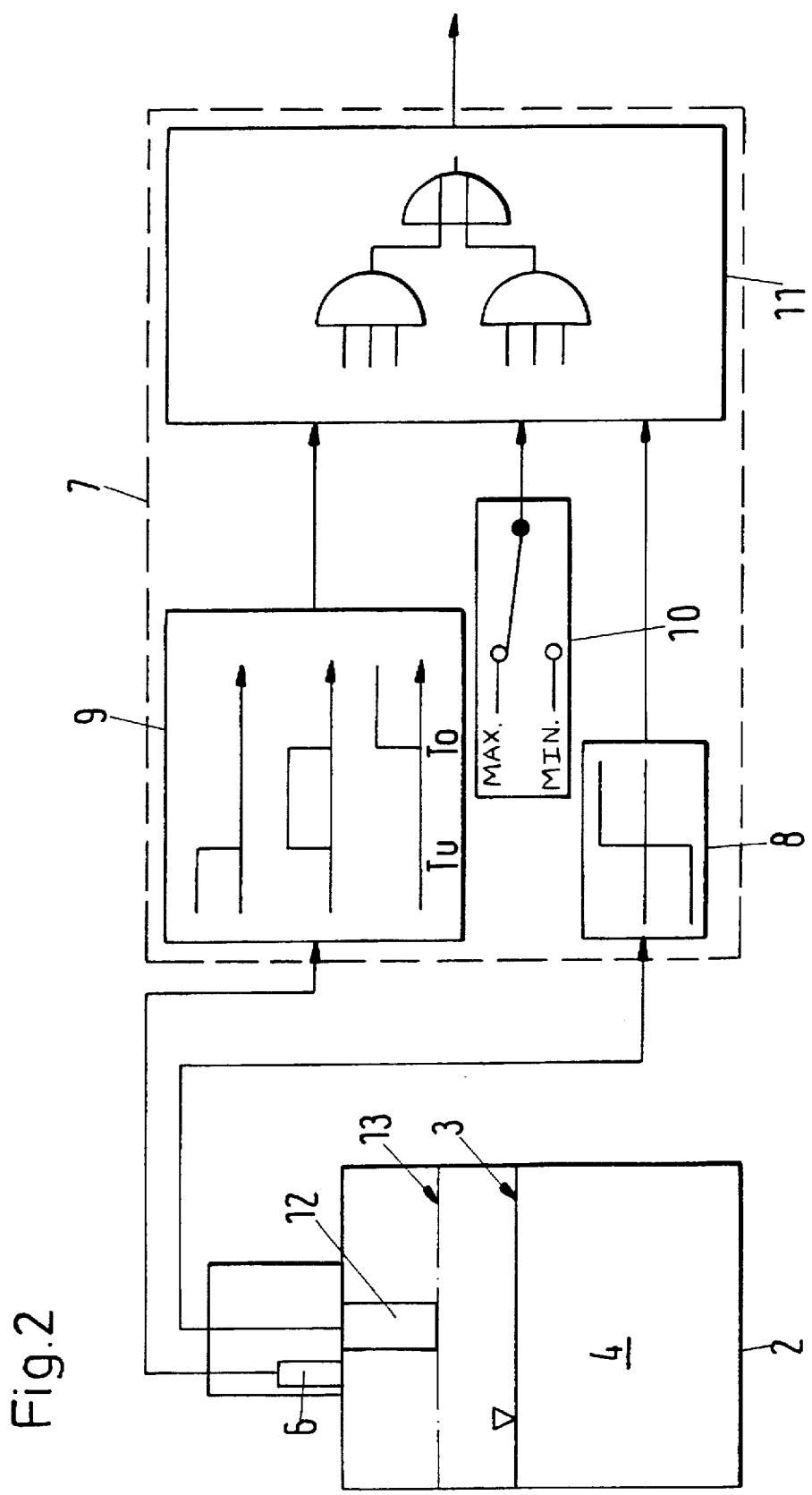

METHOD OF MONITORING THE LEVEL OF A LIQUID IN A CONTAINER

BACKGROUND OF THE INVENTION

1. Field of the Invention

The present invention relates to a method for monitoring the level of a liquid in a container.

2. The Prior Art

Level sensors detect the filling level based on the fact that the physical properties of the liquid to be monitored and of the gaseous medium present in the container above the liquid differ, for example by their electrical conductivity, or by their dielectric constant, or by their density, just to mention a few properties. In many cases, the liquid and the gaseous medium in the container represent different states of matter of the same medium, for example, feed water or condensate as the liquid, and water vapor as the gaseous medium. Up to temperatures near the critical temperature of a medium which, for water, for example, is 374.15° C., the physical properties of the liquid and gaseous phases of the medium are distinctly different from each other. However, the physical properties of the liquid and gaseous phases are the same at the critical temperature. In cases of application where the critical temperature occurs, or could occur, safe monitoring of the level of the liquid has not been possible heretofore for this reason.

SUMMARY OF THE INVENTION

It is an object of the present invention to provide a method for monitoring the level of a liquid in a container, which is applicable without safety risk even if the critical temperature of the liquid is reached, or could be reached.

This object is achieved according to the invention by providing a method of monitoring the level of a liquid in a container by means of a level sensor emitting a measuring signal conforming to the level of the liquid, and an evaluator unit forming an output signal by evaluating the measuring signal, characterized in that the temperature prevailing in the container is determined by means of a temperature sensor; that the determined temperature is compared in the evaluator unit with a preset comparative temperature value (Tu), this value being below the critical temperature of the liquid to be monitored; and that the evaluator unit, at a temperature falling short of the comparative value (Tu), forms an output signal determined by the measuring signal of the level sensor, whereas the evaluator unit, at a temperature exceeding the comparative value (Tu), forms an output signal determined by the temperature.

The temperature in the container is included in the monitoring of the level of the liquid and supplies information as to whether a distinction can be made between the liquid medium and the gaseous medium on the basis of the physical properties. The measurement of the temperature, however, is unavoidably affected by a range of standard deviations. Furthermore, the level sensors exhibit measurement inaccuracies, which means flawless monitoring of the level of the liquid is no longer possible within a limited range below the critical temperature. The evaluator unit is, therefore, supplied with a preset comparative temperature value, which is preferably below the critical temperature to an extent such that the measurement inaccuracies of the sensors will not have an interfering effect.

The measurement signal of the level sensor becomes highly significant at a temperature below the comparative temperature value and determines the output signal of the evaluator unit. The measurement signal of the level sensor is disregarded above the comparative temperature value. The evaluator unit supplies an output signal that is on the safe side with respect to the level of the liquid. At the critical temperature, it is the signal "alarm", because of the state of matter of the medium in the container is uncertain in that case.

Monitoring of the level of a liquid is frequently carried out as a control of the limit value. In this regard, a distinction has to be made between monitoring of the minimum level and monitoring of the maximum level. In the monitoring of the minimum level, the output signal should read "OK" as long as the level of the liquid in the container exceeds a fixed minimum level. However, as soon as the level of the liquid drops below the minimum level, the output signal "alarm" is emitted. Monitoring of the minimum level is required, for example in connection with boilers, in order to prevent the boiler from becoming dry. On the other hand, a monitoring of the maximum level is carried out for the purpose of emitting the "alarm" signal if the level of the liquid rises above a fixed maximum level. The output signal should read "OK" if the level of the liquid is below the maximum level. Monitoring of the maximum level is carried out, for example in conduits for draining or drying out steam turbines, so that liquid condensate is prevented to getting into the steam turbine.

According to another embodiment, in monitoring of the minimum level, the output signal "alarm" is always emitted at temperatures above the comparative temperature value. This is on the safe side because the state of matter of the medium present is uncertain at the critical temperature, and the medium exists without exception in the gaseous physical state above the critical temperature.

A further embodiment is especially advantageous for monitoring of the maximum level. A second comparative temperature level is preset, which is above the critical temperature to an extent such that the temperature in the container is safely above the critical point in spite of measurement tolerances of the temperature sensor. The output signal "alarm" is emitted at a temperature between the two comparative temperatures. The state of matter of the medium in the container is uncertain in that case. Above the second, upper comparative temperature, the output signal reads "OK". In this case, no liquid is present in the container without any doubt. Therefore, an optimal output signal that is on the safe side is assured also when monitoring a maximum level.

If, in accordance with another embodiment, the temperature sensor is positioned within the immediate proximity of the level sensor, the temperature prevailing within the range of the level sensor is determined with special exactness, so that the level sensor is capable of determining the output signal of the evaluator unit up to particularly close to the critical temperature.

BRIEF DESCRIPTION OF THE DRAWINGS

Other objects and features of the present invention will become apparent from the following detailed description considered in connection with the accompanying drawing which discloses two embodiments of the present invention. It should be understood, however, that the drawing is designed for the purpose of illustration only and not as a definition of the limits of the invention.

In the drawing, wherein similar reference characters denote similar elements throughout the views:

FIG. 1 shows by way of example a schematic view of a system for monitoring the minimum level of a liquid; and FIG. 2 shows by way of example a schematic view of a system for monitoring the maximum level of a liquid.

DETAILED DESCRIPTION OF PREFERRED EMBODIMENTS

Turning now in detail to the drawings, FIG. 1 shows a level probe 1 which projects into a container 2 from the top, for example into a high-pressure boiler. In the container 2, the level 3 of a liquid 4, for example water, is to be monitored as to whether it falls short of a fixed minimum level 5. A temperature sensor 6 is arranged on the container 2 directly next to the level sensor 1. The level and temperature sensors 1, 6 are combined into one constructional unit. Provision is made for an electronic evaluator unit 7, which has a level switch 8, a temperature evaluator 9, a reversing switch 10, and a logic circuit 11. The temperature sensor 6 is connected to the temperature evaluator 9, and the level sensor 1 is connected to the level switch 8.

On the reversing switch 10, reversing is possible between "max" and "min", i.e., between monitoring of the maximum level and monitoring of the minimum level, so that the evaluator unit 7 can be selectively used for each of the two monitorings. In the present example, the reversing switch 10 is set for monitoring of the minimum level. The logic circuit 11 processes the signals of the level switch 8, the temperature evaluator 9 and the reversing switch 10, and based on these signals forms an output signal that can be used for messages or controls.

An analog measurement signal corresponding to the temperature near the level sensor 1 in the container 2 is supplied by the temperature sensor 6 to the temperature evaluator 9, with a first or lower comparative temperature value Tu, and a second upper comparative temperature value To, respectively, being preset into the evaluator. The temperature evaluator 9 forms binary switching signals, which indicate whether the temperature in the container 2 is below the lower comparative value Tu, between the two comparative values Tu and To, or above the upper comparative value To. The lower comparative value Tu is below the critical temperature of the liquid 4, and the upper comparative value To is above the critical temperature of the liquid, in either case to an extent such that inaccuracies in the measurement of the temperature sensor 9 and the level sensor 1 are taken into account. At the lower comparative value Tu, the actual temperature in the container 2 is so low that the liquid 4 present in the container can be safely detected by the level sensor 1. At the upper comparative value To, the temperature in the container 2 is so high that without any doubt no liquid 4 is present in this container.

The level sensor 1 supplies the level switch 8 with an analog measuring signal. At temperatures below Tu, the value of said measuring signal depends on whether the level sensor 1 is immersed in the liquid 4, and if so, to which extent it is immersed in this liquid. Based on the analog measuring signal, the level switch 8 generates binary switching signals with the meaning "liquid detected" or "no liquid detected".

If the temperature in the container 2 is below the lower comparative value Tu and the level switch 8 emits at the same time the switching signal "liquid detected", the logic circuit 11 emits the output signal "OK". On the other hand, the switching signal "no liquid detected" results in the output signal "alarm". If, in a monitoring of the minimum level, the temperature in the container 2 should exceed the lower comparative value Tu, the logic circuit 11 emits the output signal "alarm", and the switching signal of the level switch 8 remains disregarded in this situation. In this way, it is possible to monitor the minimum level of the liquid 4 up to the comparative temperature Tu, thus close to the critical temperature of the liquid 4. Should this temperature be exceeded, the output signal of the logic circuit 11 will read "alarm"; and this signal is for the sake of safety so as to assure the safe operation of the device.

In FIG. 2, the level 3 of the liquid 4 in the container 2 is to be monitored by means of the level sensor 12 as to whether it exceeds a fixed maximum level 13. For this purpose, the reversing switch 10 is set to "max".

If the temperature in the container 2 is below the lower comparative value Tu and the level 3 of the liquid 4 is below the maximum level 13, the level switch 8 supplies the switching signal "no liquid detected". Thereupon, the logic circuit 11 emits the output signal "OK". However, the switching signal "liquid detected" results in the output signal "alarm". If, in a monitoring of the maximum level, the temperature in the container 2 should exceed the lower comparative level Tu, the switching signal of the level switch 8 remains disregarded in the formation of the output signal. A temperature between the lower and the upper comparative values Tu, To, respectively, leads in the logic circuit 11 to the output signal "alarm". This is correct in view of the uncertain state of matter of the medium in the container 2. If the upper comparative value To is exceeded, the output signal "OK" is emitted. Since no liquid can be present in the container 2 at such temperatures, this output signal is correct. This means that a high measure of functional safety is assured in any monitoring of a maximum level.

While several embodiments of the present invention have been shown and described, it is to be understood that many changes and modifications may be made thereunto without departing from the spirit and scope of the invention as defined in the appended claims.

What is claimed is:

1. Method of monitoring the level of a liquid in a container comprising the steps of using a level sensor for emitting a measuring signal conforming to the level of the liquid;

using an evaluator unit for forming an output signal by evaluating the measuring signal;

determining the temperature prevailing in the container by a temperature sensor located near the level sensor;

comparing the determined temperature in the evaluator unit with a preset first comparative temperature value Tu, said value Tu being below the critical temperature of the liquid to be monitored;

forming an output signal in the evaluator unit, wherein at temperature below the first comparative value Tu, said output signal is determined by the measuring signal of the level sensor and at a temperature exceeding the first comparative value Tu, said output signal is determined by the temperature; and wherein when a minimum level of the liquid is monitored, said output signal formed in said evaluator unit is an "alarm" at a temperature exceeding the first comparative temperature value Tu.

2. Method of monitoring the level of a liquid in a container comprising the steps of using a level sensor for emitting a measuring signal conforming to the level of the liquid;

using an evaluator unit for forming an output signal by evaluating the measuring signal;

determining the temperature prevailing in the container by a temperature sensor located near the level sensor;

comparing the determined temperature in the evaluator unit with a preset first comparative temperature value Tu, said value Tu being below the critical temperature of the liquid to be monitored;

forming an output signal in the evaluator unit, wherein at temperature below the first comparative value Tu, said output signal is determined by the measuring signal of the level sensor and at a temperature exceeding the first comparative value Tu, said output signal is determined by the temperature;

wherein when monitoring a maximum level of liquid, comparing the determined temperature in the evaluator unit with a preset second comparative temperature value To if the first comparative temperature value Tu is exceeded, said second comparative value To being above the critical temperature of the liquid to be monitored; and wherein when said determined temperature the second comparative temperature value To while the maximum level of liquid is monitored, the evaluator unit forming the output signal "OK", whereas when said determined temperature is between the two comparative temperature values, the evaluator unit forming the output signal "alarm".

3. Method according to claim 1, comprising locating the temperature sensor near the level sensor.

* * * * *